United States Patent
Rossi, III

[11] Patent Number: 5,918,375
[45] Date of Patent: Jul. 6, 1999

[54] NAIL CLIPPER WITH MEASURING GAUGE

[76] Inventor: John A. Rossi, III, 518 Helena Ave., Cherry Hill, N.J. 08002

[21] Appl. No.: 08/932,043

[22] Filed: Sep. 17, 1997

[51] Int. Cl.$^6$ .............................. G01B 3/02; A45D 29/02
[52] U.S. Cl. ................................ 33/485; 33/512; 30/29; 132/75.5
[58] Field of Search ....................... 33/485, 512; 30/26, 30/27, 28, 29; 132/73.5, 75.3, 75.4, 75.5

[56] References Cited

U.S. PATENT DOCUMENTS

| | | | |
|---|---|---|---|
| 1,363,164 | 12/1920 | Oesterwitz | 30/28 |
| 2,112,790 | 3/1938 | Scharnewski | 30/29 |
| 2,955,354 | 10/1960 | Laing | 30/29 |
| 3,160,957 | 12/1964 | Phillips | 33/485 |
| 3,812,868 | 5/1974 | Keating | 132/75.4 |
| 3,838,507 | 10/1974 | Clark | 30/29 |
| 4,228,585 | 10/1980 | Nelson | 30/29 |
| 4,819,673 | 4/1989 | McMullen, Jr. | 132/75.5 |
| 4,856,190 | 8/1989 | Reiswig | 30/29 |
| 4,982,747 | 1/1991 | Shah | 132/755 |
| 5,557,849 | 9/1996 | Lee et al. | 30/29 |
| 5,727,318 | 3/1998 | Reiswig | 30/29 |
| 5,791,049 | 8/1998 | Dolev | 132/75.5 |

FOREIGN PATENT DOCUMENTS 2413887  10/1975  Germany ................................. 30/28

*Primary Examiner*—G. Bradley Bennett
*Attorney, Agent, or Firm*—William H. Eilberg

[57] ABSTRACT

A nail clipper includes a gauge which determines the length of the nail being cut. The gauge is held by friction against one of the jaws of the clipper, and can slide back and forth to a desired position. The gauge includes a flange against which the fingertip is brought into abutment. In another embodiment, the flange includes a recess which mates with a fingertip. The latter embodiment prevents accidental cutting of the fingertip, and is especially suitable for use in cutting children's fingernails. In still another embodiment, the nail clipper resembles a guillotine, and a U-shaped gauge member slides back and forth in a holding device to determine the length of the nail to be cut. A finger holder connected to the gauge member provides secure contact between the fingertip and the gauge member. The invention substantially improves the efficiency with which artificial nails can be cut precisely to a desired length.

8 Claims, 5 Drawing Sheets

NAIL CLIPPER WITH MEASURING GAUGE

BACKGROUND OF THE INVENTION

This invention relates to the field of fingernail care, and provides a device which makes it easier to cut a nail to a desired length.

Artificial nails are attached to the fingers by gluing a set of artificial nail tips onto the natural fingernails. After gluing, it becomes necessary to trim the tips to a desired size. Each person has different nail bed lengths; even nails on the same hand of the same person may have unequal lengths. With the technology of the prior art, it is difficult or impossible to make the lengths equal, or to make them conform exactly to the wishes of the wearer. The length of the free edge of the nail tips can range from one sixteenth of an inch to one full inch. After cutting one nail tip to a desired length, it is very difficult, if not impossible, to form the remaining nine nail tips with exactly the same length. Indeed, virtually every nail technician has experienced the frustration of finishing a job, and then being told by the customer that one of her nails appears longer or shorter than the others.

The present invention solves the problem described above by providing a nail clipper having a gauge which can be used to insure that the nail will be cut exactly to the desired length. The present invention also provides means for protecting the finger while the nail is being cut. The latter variation can be used in nail clippers for children. Moreover, the invention can be incorporated into existing nail clippers without substantial modification of the basic clipping mechanism.

SUMMARY OF THE INVENTION

In one preferred embodiment, the present invention includes a conventional nail clipper having an upper jaw and a lower jaw, and a sliding gauge member. The gauge member has an elongated body which has a slot, allowing the gauge member to slide back and forth. The gauge member also has a flange at one end, the flange being generally perpendicular to the body of the gauge member. The gauge member has a plurality of markings which represent various lengths. The gauge member is held against one of the jaws by pressure created by a pin which holds and guides the jaws. The pin passes through the slot in the gauge member, so that the gauge member is relatively free to move back and forth. However, a stop formed on the gauge member prevents it from rotating about the pin. One can slide the gauge member to a desired position which dictates the length of the nail that will be cut. The fingertip is held against the flange, with the nail tip extending towards the jaws. Engagement of the jaws then cuts the nail tip to the desired length.

In another preferred embodiment, the flange includes a recess which is shaped to mate with a fingertip. This embodiment is especially useful in cutting children's nails, because the recess provides a comfortable place for the fingertip, and tends to prevent accidental cutting of the skin. In the latter arrangement, the sliding gauge may be replaced by a fixed member which defines the recess.

In another preferred embodiment, the clipper comprises a blade which is similar to that of a guillotine. The clipper includes a stationary handle member, a pivoting handle member, and a blade which moves in response to movement of the pivoting handle member. This embodiment includes a U-shaped gauge member which is mounted in a holding device that is affixed to the stationary handle member. The gauge member is slidable through holes in the holding member, and has markings which indicate the distance to which it has been moved. The holding member provides means for tightening the gauge member in a desired position. The finger abuts the gauge member such that the nail can be cut reliably to a desired length. The gauge member may also include a recess which is shaped to mate with the user's fingertip.

The present invention therefore has the primary object of providing a method and apparatus for cutting fingernails to a desired length.

The invention has the further object of providing a nail clipper which reduces the likelihood of cutting the fingertip when attempting to clip a nail.

The invention has the further object of facilitating the cutting of children's fingernails.

The invention has the further object of making it easier to provide a set of artificial fingernails having a desired length.

The invention has the further object of making it feasible to cut a plurality of fingernails to substantially the same lengths.

The invention has the further object of improving the efficiency and accuracy of the process of providing artificial fingernails.

The reader skilled in the art will recognize other objects and advantages of the invention, from a reading of the following brief description of the drawings, the detailed description of the invention, and the appended claims.

DETAILED DESCRIPTION OF THE INVENTION

Figure 1:
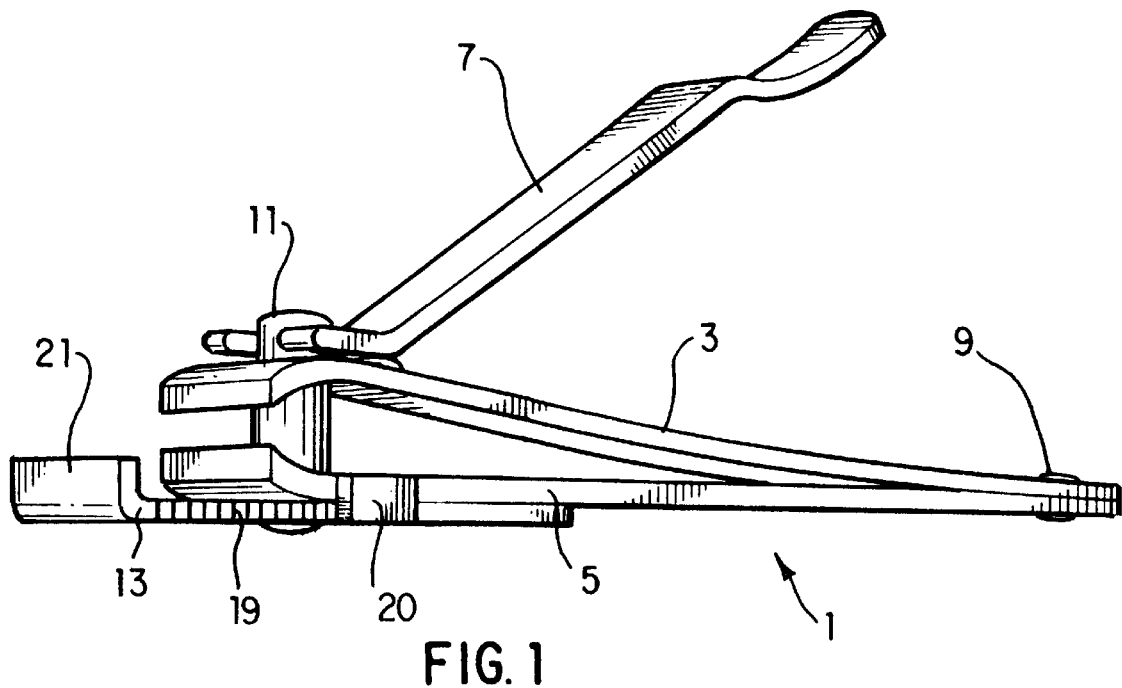
FIG. 1 provides a perspective view of one embodiment of the nail clipper of the present invention.
Figure 4:
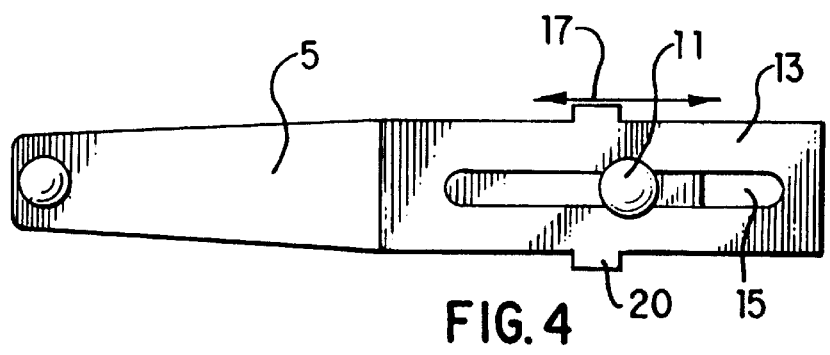
FIG. 4 provides a bottom view of the nail clipper of FIG. 1, showing the mounting of the gauge member to the lower jaw of the clipper.

FIG. 1 provides a perspective view of a first preferred embodiment of the present invention. Nail clipper 1 includes upper jaw 3, lower jaw 5, and lever 7. The upper and lower jaws are secured together at their non-cutting ends by a bolt or rivet 9, and are guided and secured near their cutting ends by pin 11. Gauge member 13 is held firmly, but not too tightly, against lower jaw 5. Stop 20 prevents the gauge member from rotating around the pin. The pin 11 extends through slot 15 in the gauge member, the slot being most clearly visible in FIG. 4. Thus the pin holds the gauge member in frictional contact with the lower jaw. The gauge member is still free to slide back and forth, as indicated by arrow 23 in FIG. 2, and also by arrow 17 in FIG. 4, while in frictional engagement with the lower jaw. Stop 20 spans the thickness of both the gauge member and the lower jaw, so that in addition to preventing rotation of the gauge member, the stop also serves to guide the gauge member and maintain its orientation as the gauge member slides back and forth along the lower jaw. The gauge member preferably includes markings 19 which provide an indication of the distance to which the gauge member has been moved. The latter distance governs the length of the nail that will be cut.

Figure 5:
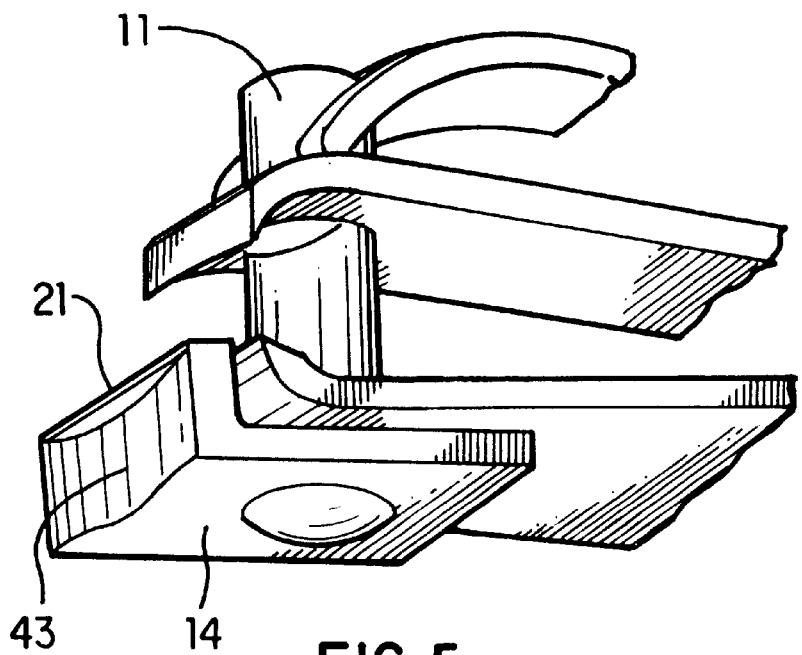
FIG. 5 provides a fragmentary perspective view of another embodiment of the nail clipper of the present invention, showing a finger recess which protects the fingertip of a user.
Figure 6:
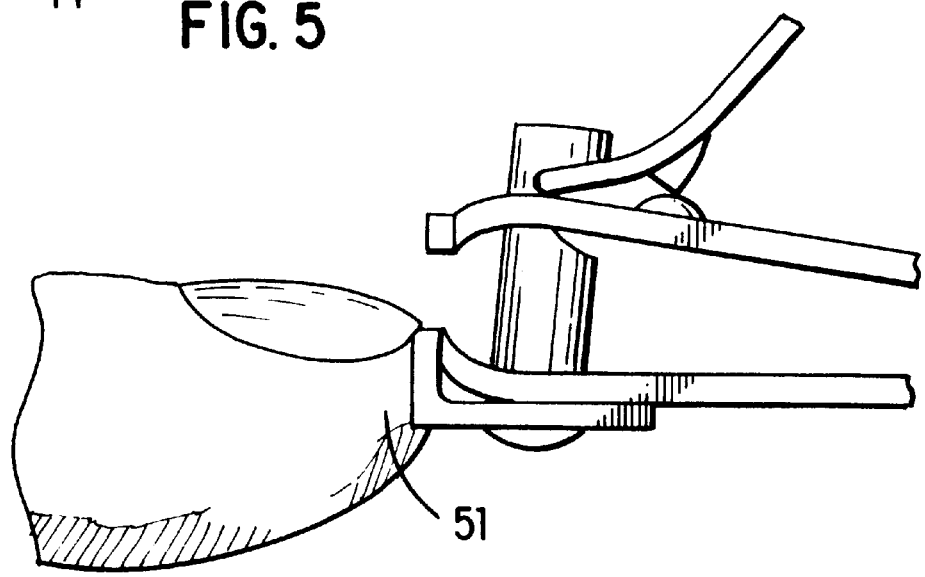
FIG. 6 provides a fragmentary side view of the embodiment of FIG. 5, showing the use of this embodiment in cutting a nail.

The gauge member also includes flange 21, which is generally perpendicular to the main body portion of the gauge member. The flange can be a flat surface against which a finger will abut (as shown in FIG. 3), or it can include a recess shaped to mate with the fingertip, as illustrated in FIGS. 5 and 6.

The upper and lower jaws, and the lever, are substantially the same as those components found in nail clippers of the prior art. The pin 11 is similar to pins used in the prior art, except that it has been lengthened somewhat to accommodate the gauge member.

Figure 2:
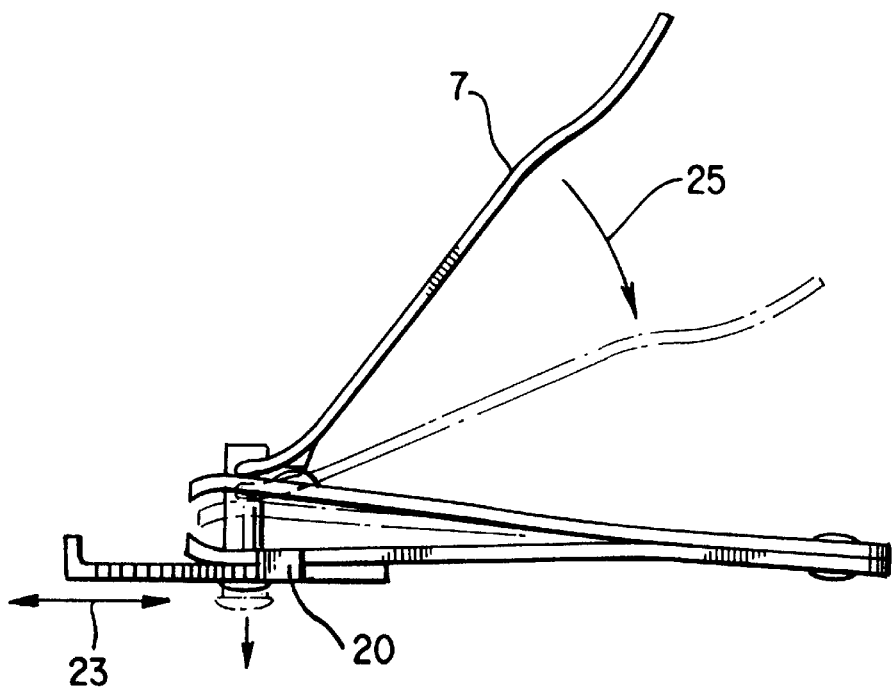
FIG. 2 provides a side view of the nail clipper shown in FIG. 1, and illustrating the movement of one of the jaws of the clipper, and the movement of the gauge member.

FIG. 2 shows the basic operation of the nail clipper. The lever 7 moves, as indicated by arrow 25, to the position shown in phantom, thereby causing the jaws to come together and to cut a nail.

Figure 3:
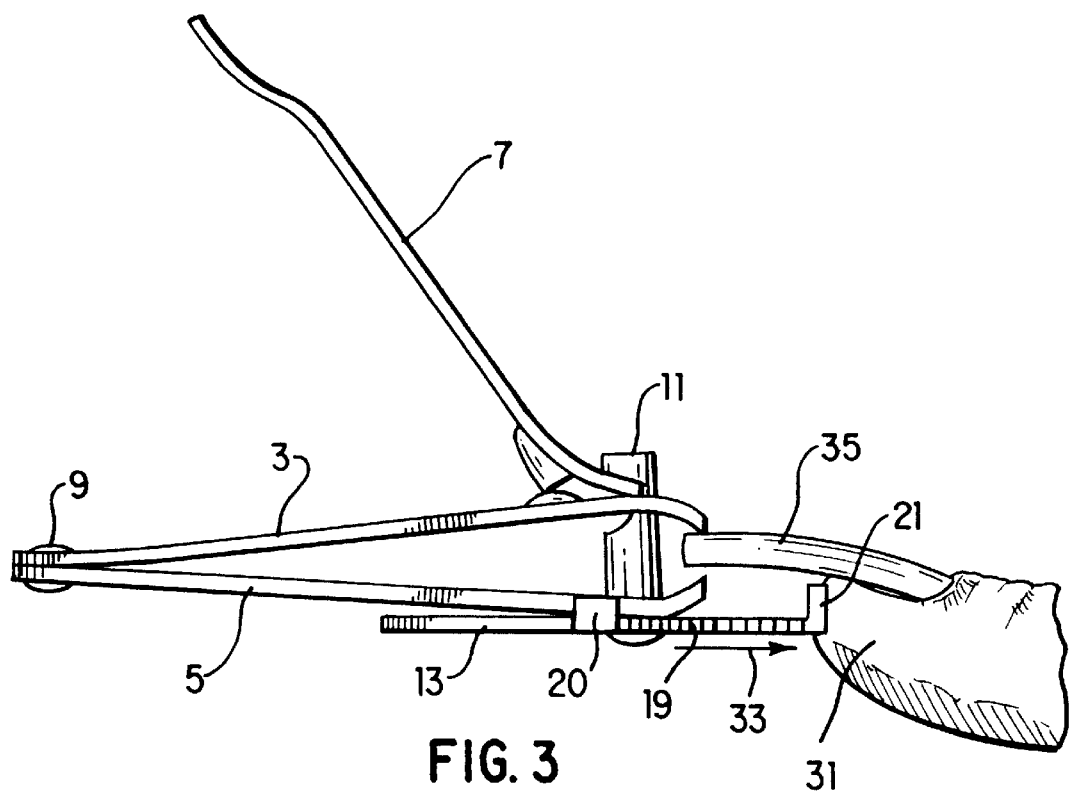
FIG. 3 provides a side view of the nail clipper of FIG. 1, showing the use of the clipper to cut a nail.

FIG. 3 shows the use of the present invention. The fingertip 31 of a user is held against the outer surface of flange 21. The gauge member is moved in the direction indicated by arrow 33, to hold the fingertip in a position which will cause nail 35 to be cut to a desired length. The markings 19 can be calibrated such that the gauge member can be moved to the correct position even before the fingertip is present. Movement of the gauge member is also illustrated in the bottom view of FIG. 4. Friction between the pin 11 and the lower jaw 5 holds the gauge member reliably in place, but not so tightly that the gauge member cannot be moved if desired. It is preferred that the position of the gauge member be adjusted first, and that the fingertip then be brought into abutment with the flange. The nail clipper can then be used in a conventional manner, i.e. by moving the lever until the jaws clip off a portion of the nail.

FIGS. 5 and 6 illustrate an alternative embodiment which is especially suitable for cutting children's fingernails. This alternative embodiment is similar to the embodiment shown in FIGS. 1–4, except for the following three features. First, the flange 21 of member 14 has a recess or indentation 43 which is preferably shaped to mate with a fingertip. Secondly, member 14 (unlike member 13) does not have a slot, but instead is permanently affixed to the lower jaw, in one position, by pin 11. Thirdly, member 14 does not have markings indicating position, since it does not move. In this embodiment, member 14 functions solely as a means for comfortably receiving the user's fingertip.

FIG. 6 shows the use of the embodiment of FIG. 5. The fingertip 51 is brought into abutment with the recess described above, and the fingernail is cut in the usual manner. The recess is not visible in FIG. 6.

It is possible to combine one or more of the features of the embodiment of FIGS. 5 and 6 with the embodiment of FIGS. 1–4. That is, it is possible to provide a flange having a recess, in the embodiment of FIGS. 1–4, while still having a slot which allows the gauge member to slide back and forth. It is also possible to provide a fixed gauge member, in the embodiment of FIGS. 1–4, though such an arrangement would not have the advantage of adjustability of the position of the gauge member. It is also possible to omit the markings from the gauge member. All such modifications are within the scope of the present invention.

Figure 7:
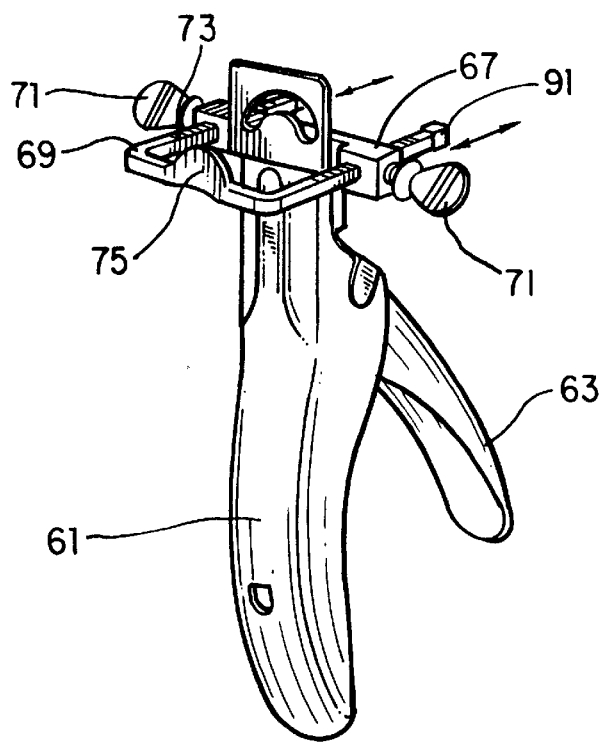
FIG. 7 provides a perspective view of another embodiment of the present invention, including a nail clipper having a U-shaped gauge member.
Figure 8:
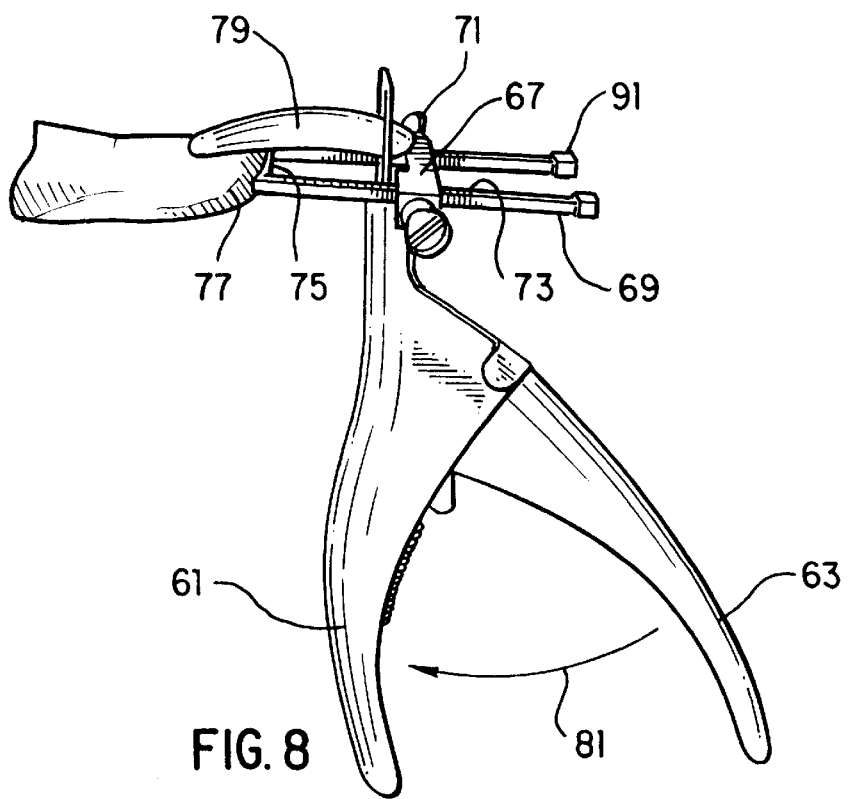
FIG. 8 provides a side view of the embodiment of FIG. 7, showing the use of the device in cutting a nail.
Figure 9:
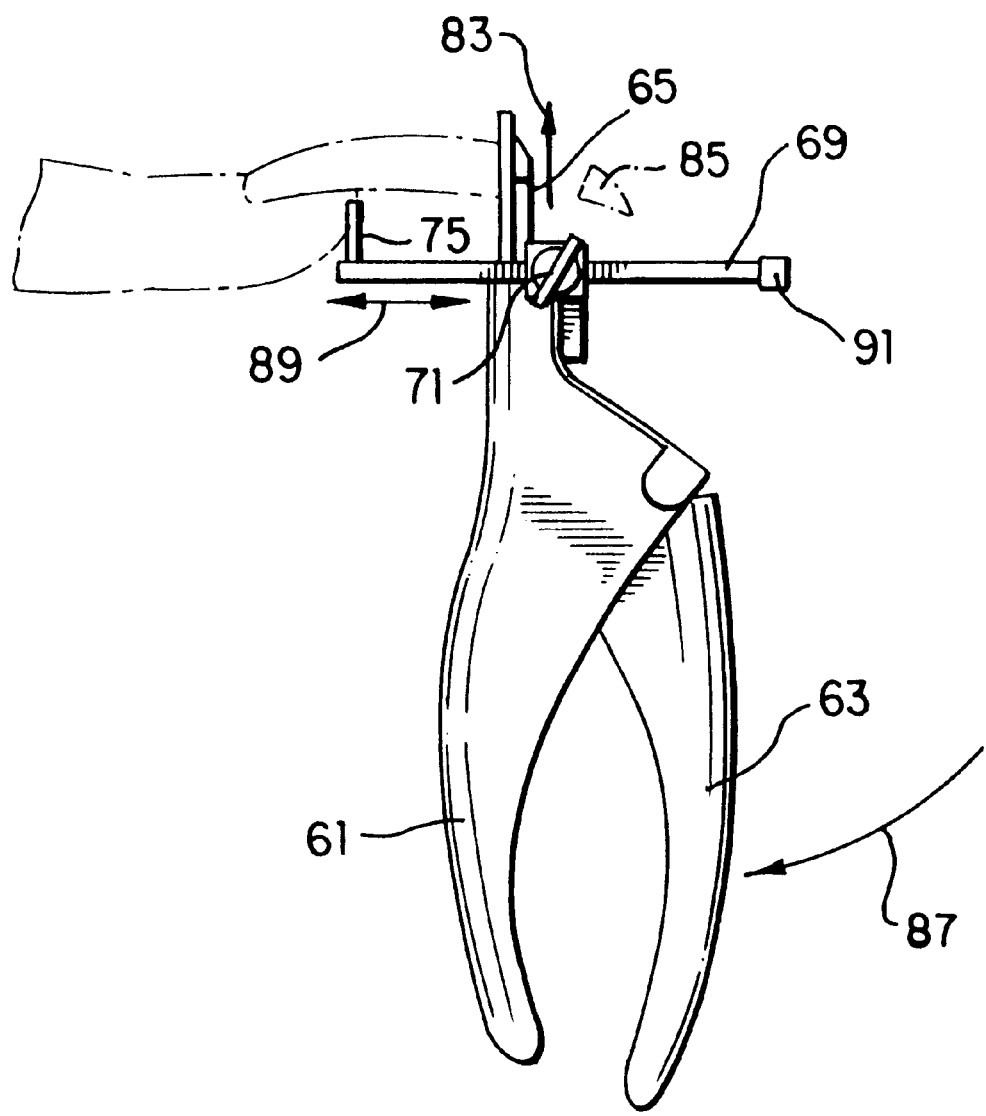
FIG. 9 provides another side view of the embodiment of FIG. 7, showing the completion of a cutting operation.

FIGS. 7–9 illustrate another alternative embodiment. In this embodiment, the nail clipper includes a stationary handle member 61, a pivoting handle member 63, and a cutting blade 65 connected to be actuated by the pivoting handle member. In effect, the cutting blade is similar to that of a guillotine. A holding means 67 is mounted to the stationary handle member, and a U-shaped gauge member 69 is mounted for sliding movement through holes formed in the holding means. As shown in the drawings, the U-shaped member has two end-pieces and one cross-piece. Finger screws 71 are used to tighten the gauge member and hold it in a selected position. The gauge member includes a plurality of markings 73 which indicate the position to which the gauge member has been moved. In the preferred embodiment, the gauge member also includes finger holder 75 which is shaped to mate with a fingertip. The finger holder 75 is analogous to the recess shown in FIG. 5. The finger holder can be integral with the gauge member, or it can be separately formed and suitably attached thereto. It is even possible to omit the finger holder, in which case the finger is simply brought into abutment with the cross-piece of the U-shaped member.

FIG. 8 shows the nail clipper in use. Fingertip 77 is brought into abutment with finger holder 75. The distance to which gauge member 69 protrudes determines the amount of nail 79 which extends beyond the position of the blade. Thus, the gauge member assures that only the desired length of nail will be cut off when the pivotable handle 63 is moved in the direction indicated by arrow 81.

FIG. 9 shows the cutting operation in another side view. The pivotable handle 63 has been moved to its extreme compressed position, as shown by arrow 87, causing blade 65 to move in the direction of arrow 83, thereby cutting off a piece 85 of the nail. Arrow 89 indicates the direction of movement of the gauge member. The gauge member is moved to the desired position, and then tightened, before the fingertip is brought into abutment with it.

The free ends of the U-shaped gauge member can be provided with caps 91, which could be made of plastic, to reduce the likelihood of injury or damage, during storage or transportation of the nail clipper, due to scraping of the ends of the gauge member.

While the invention has been described with respect to the embodiments shown in the drawings, still other modifications are possible. Such modifications should be deemed within the spirit and scope of the following claims.

What is claimed is:

1. A nail clipper comprising a stationary handle member and a pivoting handle member, a cutting blade connected for actuation by said pivoting handle member, and a U-shaped gauge member, the gauge member including first and second legs and a cross-piece connecting said first and second legs, at least one of the first and second legs having calibration markings, the gauge member being held in a holding means which is mounted to the stationary handle member, the gauge member being slidable through holes in the holding means, wherein the gauge member defines a plane, and wherein the cross-piece includes a finger holder which protrudes out of said plane, wherein the finger holder is shaped to mate with a fingertip of a user.

2. The nail clipper of claim 1, wherein the gauge member has at least one free end, and wherein the gauge member includes a cap covering said free end.

3. The nail clipper of claim 1, wherein the nail clipper also includes a nail guide comprising a generally flat member having a slot which is shaped to receive a fingernail therethrough, the nail guide being mounted to one of the handle members, and wherein the blade is positioned to slide parallel to the nail guide when actuated by the pivoting handle member.

4. A nail clipper comprising a stationary handle member and a pivoting handle member, a nail guide comprising a generally flat member having a slot which is shaped to receive a fingernail therethrough, the nail guide being mounted to one of the handle members, a cutting blade connected for actuation by said pivoting handle member, the blade being positioned to slide parallel to the nail guide, the nail clipper further comprising a gauge member having calibration markings, the gauge member being held in a holding means which is mounted to the stationary handle member, the gauge member being slidable through a hole in the holding means.

5. The nail clipper of claim 4, wherein the gauge member includes at least two legs defining a plane, and wherein at least one leg includes a finger holder which protrudes out of said plane, wherein the finger holder is shaped to mate with a fingertip of a user.

6. The nail clipper of claim 5, wherein the blade and the nail guide are generally perpendicular to said plane.

7. A method of cutting a fingernail, comprising the steps of sliding a gauge member, the gauge member having calibration markings, the gauge member having a body defining a plane, the gauge member being attached to a nail clipper, until the gauge member is positioned at a desired location indicated by said calibration markings, bringing a fingertip into abutment with a flange attached to an end of the gauge member and which flange protrudes out of said plane, while also inserting a fingernail into a slot formed in a nail guide attached to the nail clipper, and activating the clipper to cut a piece of a fingernail which has been inserted into the slot.

8. The method of claim 7, wherein the step of bringing the fingertip into abutment with the flange comprises fitting the fingertip into a recess defined by the flange.

\* \* \* \* \*